United States Patent
Boesen et al.

(10) Patent No.: US 6,952,483 B2
(45) Date of Patent: Oct. 4, 2005

(54) VOICE TRANSMISSION APPARATUS WITH UWB

(75) Inventors: Peter V. Boesen, Des Moines, IA (US); James F. Boesen, Jr., West Des Moines, IA (US)

(73) Assignee: Genisus Systems, Inc., Des Moines, IA (US)

( * ) Notice: Subject to any disclaimer, the term of this patent is extended or adjusted under 35 U.S.C. 154(b) by 73 days.

(21) Appl. No.: 10/235,770

(22) Filed: Sep. 5, 2002

(65) Prior Publication Data

US 2002/0196955 A1 Dec. 26, 2002

Related U.S. Application Data

(63) Continuation-in-part of application No. 10/134,239, filed on Apr. 29, 2002, which is a continuation of application No. 09/587,743, filed on Jun. 5, 2000, now Pat. No. 6,408,081, which is a continuation of application No. 09/309,107, filed on May 10, 1999, now Pat. No. 6,094,492, and a continuation-in-part of application No. 09/607,305, filed on Jun. 30, 2000, now Pat. No. 6,823,195, and a continuation-in-part of application No. 09/707,515, filed on Nov. 7, 2000, now Pat. No. 6,738,485.

(51) Int. Cl.[7] .............................................. H04R 25/00
(52) U.S. Cl. ...................... 381/326; 381/315; 455/90.3
(58) Field of Search ................................ 381/23.1, 312, 381/314, 315, 321, 322, 326, 328, 329, 330, 151; 370/310, 312, 313, 342, 343; 455/89, 90.3, 100, 351; 379/430

(56) References Cited

U.S. PATENT DOCUMENTS

| 4,150,262 A | 4/1979 | Ono |
| 4,334,315 A | 6/1982 | Ono et al. |
| 4,374,382 A | 2/1983 | Markowitz |
| 4,528,987 A | 7/1985 | Slocum |
| 4,588,867 A | 5/1986 | Konomi |
| 4,654,883 A | 3/1987 | Iwata |

(Continued)

FOREIGN PATENT DOCUMENTS

| EP | 0 671 115 B1 | 9/1995 |
| EP | 0 683 621 A2 | 11/1995 |
| GB | 2 074 817 A | 11/1981 |
| JP | 10187797 | 1/2000 |
| WO | WO 02/39703 A2 | 11/2001 |
| WO | WO 02/46859 A2 | 11/2001 |

OTHER PUBLICATIONS

Article entitled: "A one–size disposable hearing aid is introduced" Staab, Wayne J., et al., The Hearing Journal, Apr. 2000, vol. 53, No. 4.

(Continued)

*Primary Examiner*—Curtis Kuntz
*Assistant Examiner*—Brian Ensey
(74) *Attorney, Agent, or Firm*—McKee, Voorhees & Sease, P.L.C.

(57) ABSTRACT

A voice communication device such as an earpiece that provides for ultra short range transmission of voice sound information using ultra wide band (UWB) radio communications is disclosed. According to one embodiment of the present invention, a voice communication device includes a speaker, a bone conduction sensor for sensing voice sound vibrations, and an UWB transceiver operatively connected to the speaker and the bone conduction sensor. According to another embodiment of the present invention, a voice communication device is disclosed that includes an earpiece housing, a speaker operatively connected to the earpiece housing for transducing audio, an air conduction sensor operatively connected to the housing for sensing voice sound information, a processor electrically connected to the speaker and the bone conduction sensor and disposed within the earpiece housing, and an UWB transceiver operatively connected to the processor.

26 Claims, 4 Drawing Sheets

U.S. PATENT DOCUMENTS

| | | | |
|---|---|---|---|
| 4,773,427 A | 9/1988 | Inoue et al. | |
| 4,791,673 A | 12/1988 | Schreiber | |
| 4,854,328 A | 8/1989 | Pollack | |
| 5,010,890 A | 4/1991 | Pfohl et al. | |
| 5,052,398 A | 10/1991 | Gober | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart, III | |
| 5,349,863 A | 9/1994 | Dumont et al. | |
| 5,381,798 A | 1/1995 | Burrows | |
| 5,404,577 A * | 4/1995 | Zuckerman et al. | 455/66.1 |
| 5,417,222 A | 5/1995 | Dempsey et al. | |
| 5,422,934 A | 6/1995 | Massa | |
| 5,458,123 A | 10/1995 | Unger | |
| 5,613,222 A | 3/1997 | Guenther | |
| 5,659,620 A | 8/1997 | Kuhlman | |
| 5,675,524 A | 10/1997 | Bernard | |
| 5,692,059 A | 11/1997 | Kruger | |
| 5,721,783 A * | 2/1998 | Anderson | 381/328 |
| 5,749,072 A | 5/1998 | Mazurkiewicz et al. | |
| 5,758,294 A | 5/1998 | Ganesan et al. | |
| 5,771,438 A | 6/1998 | Palermo et al. | |
| 5,790,684 A * | 8/1998 | Niino et al. | 381/326 |
| 5,797,089 A | 8/1998 | Nguyen | |
| 5,802,167 A | 9/1998 | Hong | |
| 5,898,908 A | 4/1999 | Griffin et al. | |
| D411,540 S | 6/1999 | Mavrakis et al. | |
| 5,929,774 A | 7/1999 | Charlton | |
| 5,933,506 A | 8/1999 | Aoki et al. | |
| 5,956,330 A * | 9/1999 | Kerns | 370/336 |
| 5,983,073 A | 11/1999 | Ditzik | |
| 5,987,146 A | 11/1999 | Pluvinage et al. | |
| 6,002,777 A | 12/1999 | Grasfield et al. | |
| 6,021,207 A | 2/2000 | Puthuff et al. | |
| 6,048,324 A | 4/2000 | Socci et al. | |
| 6,094,492 A | 7/2000 | Boesen | |
| 6,112,103 A | 8/2000 | Puthuff | |
| 6,137,889 A | 10/2000 | Shennib et al. | |
| 6,181,801 B1 | 1/2001 | Puthuff et al. | |
| 6,230,029 B1 | 5/2001 | Hahn et al. | |
| 6,272,227 B1 | 8/2001 | Yanagisawa | |
| 6,308,074 B1 | 10/2001 | Chandra et al. | |
| 6,315,074 B1 | 11/2001 | Achhammer et al. | |
| 6,351,652 B1 | 2/2002 | Finn et al. | |
| 6,408,081 B1 | 6/2002 | Boesen | |
| 6,466,125 B1 | 10/2002 | Richards et al. | |
| 6,542,721 B2 | 4/2003 | Boesen | |
| 6,554,762 B2 * | 4/2003 | Leysieffer | 600/25 |
| 6,560,468 B1 | 5/2003 | Boesen | |
| 6,661,342 B2 * | 12/2003 | Hall et al. | 340/573.1 |
| 6,668,008 B1 * | 12/2003 | Panasik | 375/139 |
| 2001/0027121 A1 | 10/2001 | Boesen | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0083058 A1 | 5/2003 | Mayer | |

OTHER PUBLICATIONS

Article entitled: "The Hearing Review, Jan. 1999, vol. 3: Hearing in Noise", pp. 1–62.

Article entitled: "5$^{th}$ International Conference on Wearable Computers" by Rick Johnson, Pen Computing Magazine, Aug. 2000.

Air Magic Wireless Headset User's Guide.

Article entitled: "Agilent Technologies Announces Availability of Wireless Network Cap for Portable Patient Monitor" www.healthcare.aggilent.com/press_reeleases/PRHS2920030.html Oct. 5, 2000.

Article entitled: "Agilent Technologies Introduces New Telemon Patient Monitor" www.healthcare.agilent.com/press_releases/PRHS2920016.html Oct. 15, 2000.

Article entitled: "Brain cancer victim sues cell–phone providers" www.cnn.com/2000/TECH/computing/08/08/cellular.cancer.lawsuit.idg/index.html.

Article entitled: M3 and M4 Series Patient Monitors, www.healthcare.agilent.com/show_product.pl?M3%20and20M4%20Series%20Patient%20Monitor.

Article entitled: "Report Urges Curbs on Mobile Phone Use" www.techweb.com/wire/story/TWB20000515S000 May 15, 2000.

Article entitled: Scientists link eye cancer to mobile phones by Jonathan Leake, Jan. 14, 2001; www.sunday–times.co.uk/news/pages/sti/2001/01/14/stinwenws01032.html.

Article entitled: "The latest on cell phone emissions".

Article entitled: "U.S. Will Oversee Cell–Phone Safety Studies" www.techweb.com/wire//tory/reuters/REU20000609S00 Jun. 9, 2000.

Article entitled: "What is a Wireless LAN?" 1998, Proxim, Inc.

Article entitled: "Wireless Worries: Are Cell Phones a Danger to You and Your Children," http://more.abcnews.go.com/onair/2020/2020_000526cellphones.html May, 26, 2000 by Brian Ross.

Bluetooth Usage Model, http://www.bluetooth.com/bluetooth.com/bluetoothguide/models/ultimate.asp visited Jun. 26, 2000.

Medical Manager letter, Feb. 22, 2000, pp. 1–2.

"Wireless Data Blaster," David G. Leeper, Scientific American, May 2002.

* cited by examiner

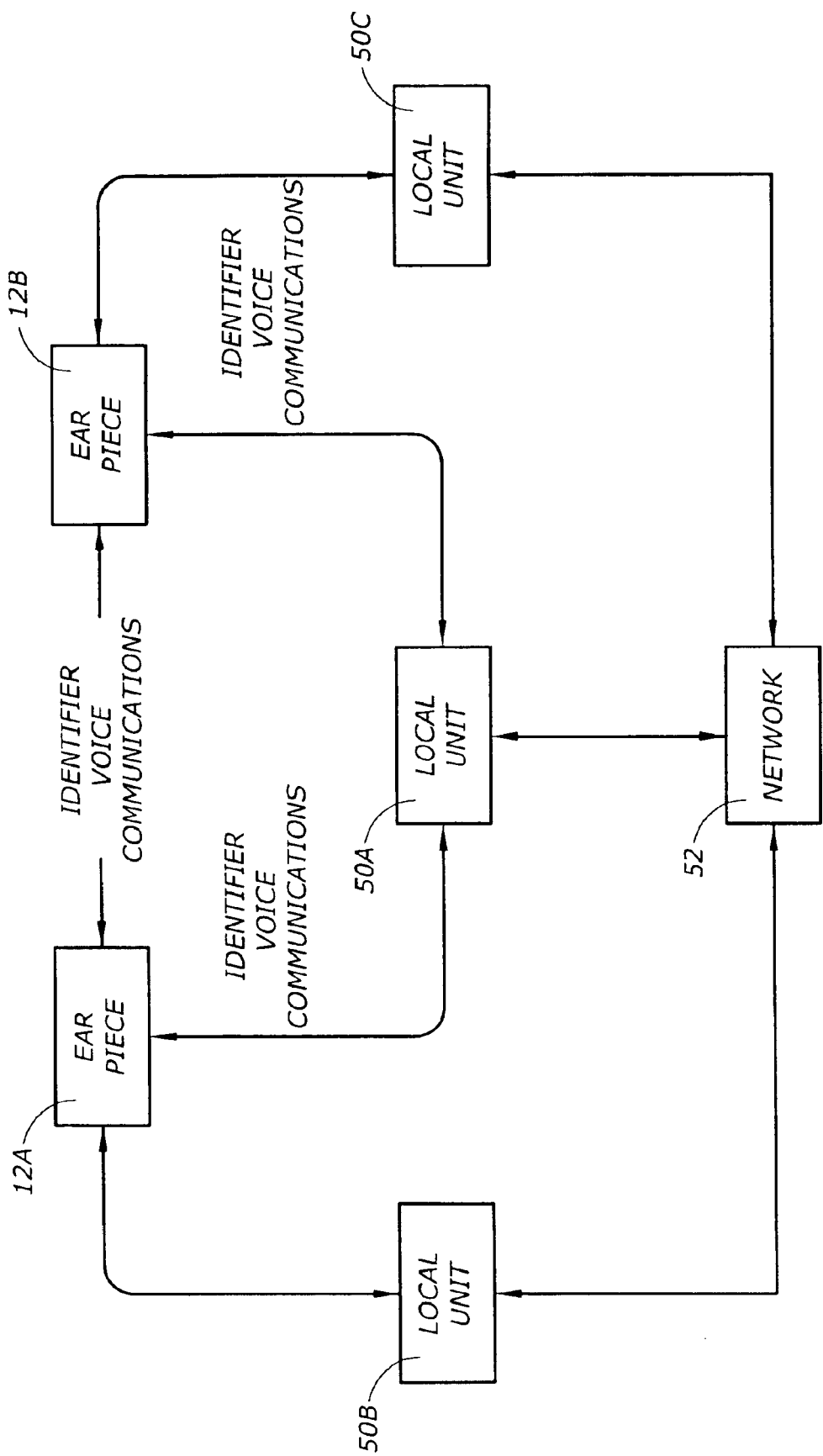

VOICE TRANSMISSION APPARATUS WITH UWB

CROSS-REFERENCE TO RELATED APPLICATIONS

This application is a continuation-in-part of U.S. Ser. No. 10/134,239 filed Apr. 29, 2002 which is a continuation of U.S. Ser. No. 09/587,743 filed on Jun. 5, 2000 which issued as U.S. Pat. No. 6,408,081, which is a continuation of U.S. Ser. No. 09/309,107 filed on May 10, 1999 which issued as U.S. Pat. No. 6,094,492. This application is also a continuation-in-part of U.S. Ser. No. 09/607,305 now U.S. Pat. No. 6,823,195 filed Jun. 30, 2000 and a continuation-in-part of U.S. Ser. No. 09/707,515 filed Nov. 7, 2000 which issued as U.S. Pat. No. 6,738,485.

BACKGROUND OF THE INVENTION

The present invention relates to a voice communication device using ultra wide band (UWB) technology. More particularly, but not exclusively, the present invention relates to the use of UWB in a two-way communications earpiece.

There has been great interest in providing improved handsfree earpieces. Various problems have arisen in different contexts regarding such earpieces. For example, one context where an improved handsfree earpiece is desired is for use in conjunction with cellular telephones. Using a handsfree earpiece not only frees the user's hands, but also allows the cellular telephone to be used without pressing the cellular telephone against the side of the head. The electromagnetic radiation of a cellular telephone is thought to be associated with certain health risks that can be reduced by moving the cellular telephone away from the head region and using an earpiece instead.

Other problems regarding cellular phones relate to the quality of the voice sound information. These same problems are also prevalent in voice recognition applications as described in U.S. Pat. No. 6,094,492, herein incorporated by reference in its entirety.

Therefore, it is a primary object, feature or advantage of the present invention to improve upon the state of the art.

It is a further object, feature, or advantage of the present invention to provide a wireless voice communication device that reduces electromagnetic radiation.

Another object, feature, or advantage of the present invention is to provide a voice communication device that provides for improved sensing of voice sound information.

Yet another object, feature, or advantage of the present invention is to provide a voice communication device that requires very low power.

These and/or other objects, features or advantages of the present invention will become apparent from the specification and claims.

SUMMARY OF THE INVENTION

The present invention relates to a voice communication device, such as an earpiece, that provides for ultra short range transmission of voice sound information using ultra wide band (UWB) radio communications. In one embodiment of the present invention, the voice sound information is sensed with a bone conduction sensor, although the present invention also provides for sensing with an air conduction sensor, as well as a plurality of sensors that can includes one or more air conduction sensors and one or more bone conduction sensors. The use of UWB allows for reductions in transmit power required and for greater bandwidth applications.

BRIEF DESCRIPTION OF THE DRAWINGS

FIG. 4 is a block diagram of one embodiment of a system of the present invention.

DETAILED DESCRIPTION OF AN EXEMPLARY EMBODIMENT

Figure 1:
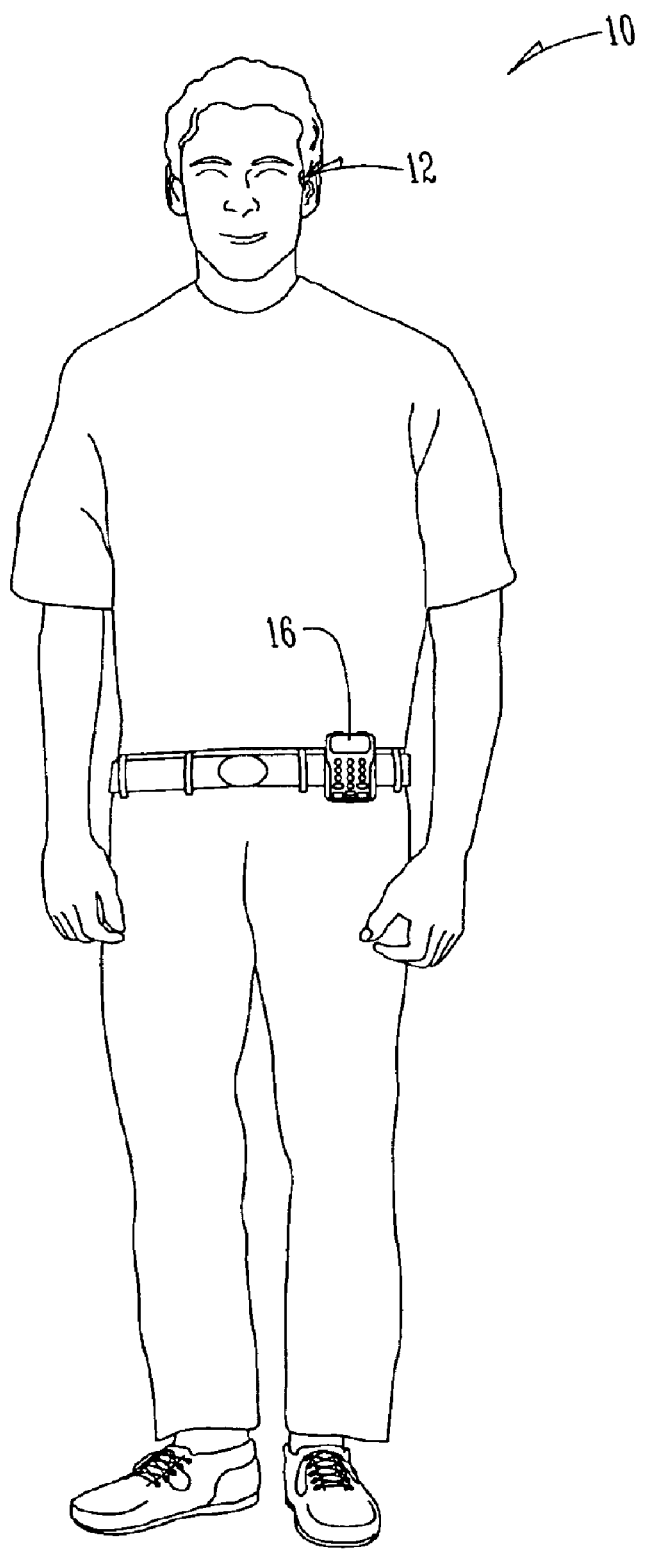
FIG. 1 is a pictorial representation of a user wearing a voice communication device according to one embodiment of the present invention.

The present invention provides a two-way voice communication earpiece using ultra wide band (UWB) technology. FIG. 1 provides a pictorial representation of a user 10 equipped with an earpiece 12 according to one embodiment of the present invention. The earpiece 12 is in wireless communication with an electronic device 16, such as a cellular telephone, personal digital assistant (PDA) or other electronic device.

Figure 2:
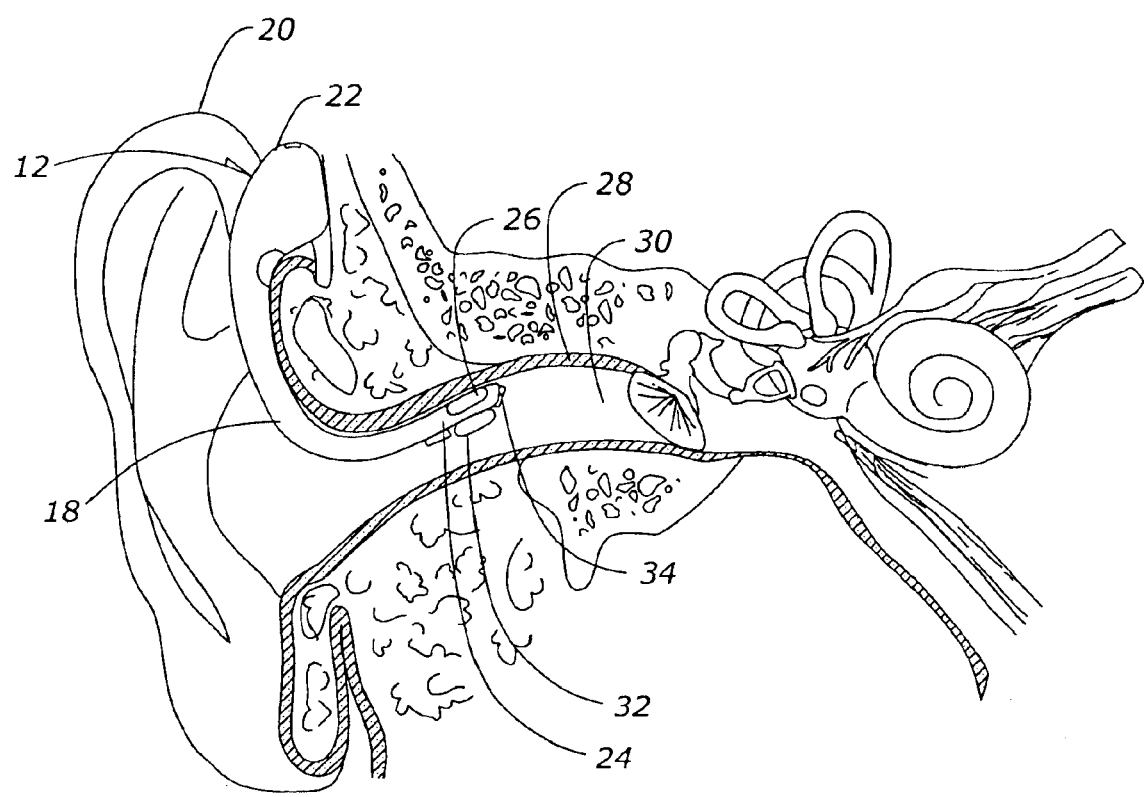
FIG. 2 is a diagrammatic representation of an earpiece according to one embodiment of the present invention placed within the ear of a user.

In FIG. 2, the earpiece 12 is shown as worn on the ear 20 of the user. The embodiment shown includes an earpiece housing 18 that includes a behind-the-ear portion 22 as well as an in-the-ear portion 24. The present invention, however, contemplates that earpiece housing 18 can take on various forms such as may be appropriate for a particular commercial embodiment. For example, the earpiece can alternatively be a complete in-the-canal earpiece.

The earpiece 12 includes a bone conduction sensor 26. Preferably, the bone conduction sensor 26 is fitted to the posterior superior wall 28 of the external auditory canal 30 of the user. This places the bone conduction sensor 26 against the mastoid region such that the bone conduction sensor 26 can sense vibrations associated with talking or other voice sound information. The present invention, however, contemplates that the bone conduction sensor can be placed elsewhere. Use of the bone conduction sensor 26 is preferred as it allows purer voice sound information to be sensed without being adulterated by ambient noises. The present invention contemplates that the bone conduction sensor 26 can be otherwise placed, but that which is shown is preferred. The bone conduction sensor is preferably small and light weight and low in power consumption. The bone conduction sensor can be an accelerometer such as is available from Endevco, or other vibratory sensing sensor.

The earpiece 12 also includes an air conduction sensor 32 such as a microphone or microphone element. The air conduction sensor 32 is also preferably placed within the external auditory canal 30 such that the sounds sensed more closely correspond with the sounds that the user hears. Note that the earpiece 12 is preferably nonocclusive in nature such that the earpiece 12 does not block the external auditory canal 30 of the user. This renders the earpiece 12 more comfortable for a user to wear and allows the user to continue to hear ambient sounds when using the earpiece 12.

A speaker 34 is also shown. The speaker is also preferably placed within the external auditory canal of the user. When placed in this manner, the volume of sound emitted from the speaker need not be as high as if the speaker was placed further away from the middle ear thus reducing power consumption. The present invention, however, contemplates that the speaker can otherwise be placed such as may be convenient or desired in a particular design or application.

Figure 3:
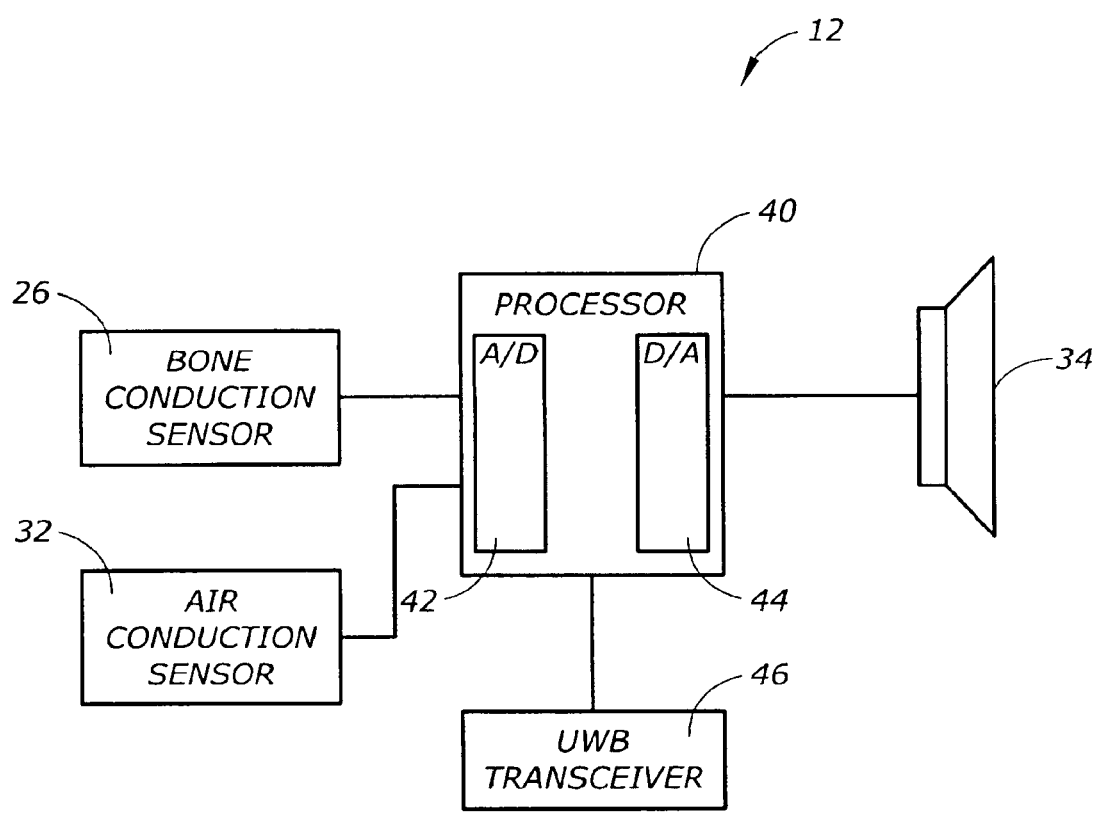
FIG. 3 is a block diagram of one embodiment of the present invention.

FIG. 3 illustrates a block diagram according to one embodiment of the present invention. In FIG. 3 the earpiece 12 is shown including an intelligent control such as, but not limited to, a processor 40. The processor includes an analog to digital converter 42 and digital to analog converter 44 and preferably is adapted to perform speech processing. The processor 40 is also electrically connected to a UWB transceiver 46. The UWB transceiver is used to transmit and receive wireless communications. Examples of UWB transceivers include those available from Time Domain Corporation or Xtreme Spectrum. The UWB transceivers use ultra short duration pulses to result in low power spectral densities and improved immunity to interference from other radio signals. For ultra short range communications, preferably the UWB transceiver of the present invention has a transmission power of less than 100 mW, and preferably even lower such as less than 100 uW. In addition, the UWB transceivers provide more than sufficient bandwidth for two-way voice communications.

The present invention contemplates that both a bone conduction sensor and an air conduction sensor need not be used. In addition, multiple bone conduction sensors or multiple air conduction sensors can be used. Alternatively one or more bone conduction sensors and one or more air conduction sensors can be used. Where multiple sensors are used, processing can take place within the earpiece 12 and its associated earpiece housing 18 and/or remotely. The UWB transceiver of the present invention preferably provides sufficient bandwidth to transmit streams from multiple sensors simultaneously such that processing can also take place remotely.

The present invention further provides that the earpiece 12, in addition to providing voice communications, can be used in the context of other applications where an identifier is associated with the earpiece 12. One such application is shown in a diagram of FIG. 4. In FIG. 4, an earpiece 12A and an earpiece 12B according to the present invention are shown. Each earpiece 12 can communicate with other earpieces or with one or more local units 50A, 50B, and 50C. Due to the short range of the UWB transceiver in the earpiece 12A or 12B, the location of each earpiece 12A or 12B can be determined based on which of the one or more local units 50A, 50B, and/or 50C and which other earpieces are in communication with the particular earpiece. The present invention contemplates that each local unit 50A, 50B and/or 50C is operatively connected to a network 52. Each local unit includes a UWB transceiver for communicating with the earpieces or other UWB devices. Communications can be sent over the network to one or more local units and then from the one or more local units to a particular earpiece. Likewise, communications from one or more earpieces can be sent through one or more local units to a network 52. As each earpiece has an identifier which is transmitted in association with any voice communications, other earpieces and/or local units can receive the identifier and can then forward on messages based on the identifier. The identifier of each earpiece can be used for identifying the sender or recipient of a particular voice communication.

Thus, the present invention provides for associating an identifier, which could be an Internet Protocol (IP) address or other identifier, with each earpiece 12 so that messages or other communications to and from the earpiece 12 can be routed through other earpieces, through local units, or otherwise.

What is claimed is:

1. A voice communication device, comprising:
   an earpiece housing
   a speaker operatively connected to the earpiece housing;
   a bone conduction sensor for sensing voice sound vibrations operatively connected to the earpiece housing; and
   an UWB transceiver operatively connected to the speaker and the bone conduction sensor and the earpiece housing.

2. The voice communication device of claim 1 further comprising a processor electricity connected to the bone conduction sensor and the UWB transceiver.

3. The voice communication device of claim 2 wherein the processor is adapted to perform digital signal processing.

4. The voice communication device of claim 3 further comprising an air conduction sensor operatively connected to the processor.

5. The voice communication device of claim 1 wherein the UWB transmitter transmits at a power of less than 1 mw.

6. The voice communication device of claim 1 wherein the UWB transmitter transmits at a power of less than 100 microwatts.

7. The voice communication device of claim 1 further wherein the UWB transceiver is at least partially disposed within the earpiece housing and the earpiece housing is adapted to be at least partially inserted into the external auditory canal of a user.

8. The voice communication device of claim 7 wherein the earpiece housing is adapted far fitting such that the earpiece housing does not block the external auditory canal.

9. The voice communication device of claim 4 wherein the processor is adapted to transmit both a signal from the air conduction sensor and a signal from the bone conduction sensor.

10. A voice communication device, comprising:
    an earpiece housing;
    a speaker operatively connected to the earpiece housing for transducing audio;
    a bone conduction sensor operatively connected to the housing for sensing voice sound information;
    a processor electrically connected to the speaker and the bone conduction sensor and disposed within the earpiece housing; and
    an UWB transceiver operatively connected to the processor.

11. The voice communication device of claim 10 wherein the processor is adapted to perform digital signal processing.

12. The voice communication device of claim 10 further comprising an air conduction sensor operative connected to the processor.

13. The voice communication device of claim 10 wherein the UWB transmitter transmits at a power of less than 1 mw.

14. The voice communication device of claim 10 wherein the UWB transmitter transmits at a power of less than 100 microwatts.

15. The earpiece of claim 10 wherein the earpiece is adapted to be at least partially inserted into the external auditory canal of a user.

16. The earpiece of claim 15 wherein the earpiece is adapted for fitting such that the earpiece does not block the external auditory canal.

17. A voice communication device, comprising:
    an earpiece housing;
    a speaker operatively connected to the earpiece housing for transducing audio;

an air conduction sensor operatively connected to the housing for sensing voice sound information;

a processor electrically connected to the speaker and the air conduction sensor and disposed within the earpiece housing; and an UWB transceiver operatively connected to the processor.

18. The voice communication device of claim 17 wherein the processor is adapted to perform digital signal processing.

19. The voice communication device of claim 17 wherein the UWB transmitter transmits at a power of less than 1 mw.

20. The voice communication device of claim 17 wherein the UWB transmitter transmits at a power of less than 100 microwatts.

21. A method of voice communications, comprising:

sensing vibrations using a bone conduction sensor of an earpiece;

digitally processing the sensed vibrations to form a voice communication signal;

transmitting the voice communications signal from the earpiece using an UWB transceiver.

22. The method of claim 21 further comprising associating an identifier of the earpiece with the voice communications signal, transmitting the identifier of the earpiece and using the UWB transceiver.

23. The method of claim 22 further comprising receiving a voice communication with the UWB transceiver, the voice communication having an identifier associated with the earpiece.

24. A method of voice communications, comprising:

sensing vibrations using at least one sensor of an earpiece;

digitally processing the sensed vibrations to form a voice communication signal;

transmitting the voice communications signal from the earpiece using an UWB transceiver.

25. The method of claim 24 wherein the at least one sensor includes at least one air conduction sensor.

26. The method of claim 24 wherein the at least one sensor includes at least one bone conduction sensor.

* * * * *

UNITED STATES PATENT AND TRADEMARK OFFICE
CERTIFICATE OF CORRECTION

PATENT NO. : 6,952,483 B2  
DATED : October 4, 2005  
INVENTOR(S) : Boesen, Dr. Peter V.

It is certified that error appears in the above-identified patent and that said Letters Patent is hereby corrected as shown below:

Column 4,  
Line 8, after "transceiver" add -- within the earpiece housing and --.  
Line 12, after "processor" delete "electricity" and replace with -- electrically --.  
Line 45, after "transceiver" add -- within the earpiece housing and --.

Column 5,  
Line 7, after "transceiver" add -- within the earpiece housing and --.  
Line 15, after "voice" delete "communications," and add -- communication, using an earpiece having an earpiece housing and an UWB transceiver within the earpiece housing, the method --.  
Line 22, after "using" delete "an" and add -- the --.

Column 6,  
Line 10, after "voice" delete "communications," and add -- communication, using an earpiece having an earpiece housing and an UWB transceiver within the earpiece housing, the method --.  
Line 16, after "using" delete "an" and add -- the --.

Signed and Sealed this

Eleventh Day of April, 2006

JON W. DUDAS  
*Director of the United States Patent and Trademark Office*